US011365878B2

(12) United States Patent
Willows et al.

(10) Patent No.: US 11,365,878 B2
(45) Date of Patent: Jun. 21, 2022

(54) ILLUMINATED HARNESS

(71) Applicant: Amphipod, Inc., Seattle, WA (US)

(72) Inventors: Keith S. Willows, Seattle, WA (US);
June A. Angus, Seattle, WA (US);
Antonio Del Rosario, Bellevue, WA (US)

(73) Assignee: Amphipod, Inc., Seattle, WA (US)

( * ) Notice: Subject to any disclaimer, the term of this patent is extended or adjusted under 35 U.S.C. 154(b) by 4 days.

(21) Appl. No.: 17/031,043

(22) Filed: Sep. 24, 2020

(65) Prior Publication Data
US 2021/0102697 A1 Apr. 8, 2021

Related U.S. Application Data

(60) Provisional application No. 62/973,513, filed on Oct. 8, 2019.

(51) Int. Cl.
*F21V 33/00* (2006.01)
*F21V 8/00* (2006.01)
*G02B 6/26* (2006.01)
*G02B 6/44* (2006.01)

(52) U.S. Cl.
CPC ........ *F21V 33/0008* (2013.01); *G02B 6/0006* (2013.01); *G02B 6/262* (2013.01); *G02B 6/4401* (2013.01)

(58) Field of Classification Search
CPC ... F21V 33/0008; G02B 6/0006; G02B 6/262; G02B 6/4401
See application file for complete search history.

(56) References Cited

U.S. PATENT DOCUMENTS 9,410,694 B2 * 8/2016 Curran ................ F21V 33/0008

* cited by examiner

*Primary Examiner* — Joseph L Williams
(74) *Attorney, Agent, or Firm* — Lowe Graham Jones PLLC

(57) ABSTRACT

An illuminated harness includes a front panel assembly and a rear panel assembly. A side-illuminating fiber optic cable is attached to the front panel assembly and the rear panel assembly, including a first belt portion and a second belt portion joining the front panel assembly to the rear panel assembly, combining to form a belt. The fiber optic cable also forms a first shoulder strap portion joining the front panel assembly to the rear panel assembly and a second shoulder portion strap joining the front panel assembly to the rear panel assembly, forming a pair of shoulder straps. A light source is coupled to the fiber optic cable and arranged to transmit light into the fiber optic cable.

25 Claims, 17 Drawing Sheets

ILLUMINATED HARNESS

PRIORITY CLAIM

This application claims the benefit of U.S. provisional application 62/973,513, the contents of which are incorporated by reference.

FIELD OF THE INVENTION

The present invention relates to reflective or high visibility garments, and more particularly to an illuminated harness system used to make the user more visible during daylight, night-time and twilight hours.

BACKGROUND OF THE INVENTION

One of the inherent disadvantages of existing safety belts, warning belts, or similar straps has been that they are generally uncomfortable to wear when jogging or engaged in other physical activities, and they can be confining, heavy, tangle easily, and generally not intuitively useable. Previously existing safety belts or harnesses have suffered from one or more of the following drawbacks: they cause user discomfort through bouncing and chafing, they are not contoured to the body, they have complex use requirements or components, they have features which impede athletic or physical activities, they are often asymmetrically weighted, and they are generally difficult or inconvenient to use.

SUMMARY OF THE INVENTION

The preferred illuminated harness as described below provides one or more benefits over existing traditional harnesses, vests, apparel and other visibility items meant to be worn on the body. First, it can be easy to put on and take off and easily adjusts to fit a variety of body sizes and types (generally only one size is needed to fit most adult people). In addition, it does not tangle easily when putting on. The preferred geometry of the illuminated harness will not restrict the user's mobility while still maximizing the visibility with illumination or reflectivity. Moreover, the positioning of reflective elements central to the user's upper body provides for excellent visibility without limiting user mobility.

A preferred illuminated harness includes a front panel assembly having a base, a top, a left side, and a right side, and a rear panel assembly having a base, a top, a left side, and a right side. A side-illuminating fiber optic cable is attached to the front panel assembly and to the rear panel assembly.

In a preferred version the fiber optic cable defines a first belt portion joining the left side of the base of the front panel assembly to the left side of the base of the rear panel assembly and a second belt portion joining the right side of the base of the front panel assembly to the right side of the base of the rear panel assembly, whereby the first belt portion and the second belt portion are configured to be positioned about a waist of a user when the illuminated harness is worn by the user.

The fiber optic cable preferably further defines a first shoulder strap portion joining the left side of the top of the front panel assembly to the left side of the top of the rear panel assembly, and a second shoulder strap portion joining the right side of the top of the front panel assembly to the right side of the top of the rear panel assembly, whereby the first shoulder strap portion and the second shoulder strap portion are configured to be positioned over the shoulders of the user when the illuminated harness is worn by the user.

A light source is coupled to the fiber optic cable and arranged to transmit light into the fiber optic cable.

In some versions, the fiber optic cable further includes a first fiber optic cable and a second fiber optic cable, the first fiber optic cable continuously forming the first belt portion and the first shoulder strap portion, and the second fiber optic cable continuously forming the second belt portion and the second shoulder strap portion.

In preferred versions, a first peripheral sleeve is attached to the left side of the front panel assembly, and a second peripheral sleeve attached to the right side of the front panel assembly. Most preferably, the first fiber optic cable is threaded through the first peripheral sleeve and the second fiber optic cable is threaded through the second peripheral sleeve.

In some versions, a third peripheral sleeve is attached to the left side of the rear panel assembly, and a fourth peripheral sleeve is attached to the right side of the rear panel assembly, the first fiber optic cable being threaded through the third peripheral sleeve and the second fiber optic cable being threaded through the fourth peripheral sleeve.

In some versions, the first peripheral sleeve extends continuously from the top of the front panel assembly to the bottom of the front panel assembly, and the second peripheral sleeve extends continuously from the top of the front panel assembly to the bottom of the front panel assembly.

Most preferably, each of the first peripheral sleeve and the second peripheral sleeve is formed from a translucent material.

In some versions, the rear panel further comprises a rear interior panel and a rear exterior panel.

In preferred versions, a housing containing a battery and having a power switch is included, the housing being attached to the rear panel.

Most preferably, the light source is electrically coupled to the battery and a portion of the first fiber optic cable and the second fiber optic cable is trapped between the rear interior panel and the rear exterior panel.

In most examples, the rear exterior panel is formed from a translucent material.

In preferred versions, the housing is positioned at the base of the rear panel, centrally located between the left side and the right side of the rear panel, and between the first and second belt portions.

In some examples, the rear exterior panel further comprises a left intermediate through-hole, a first left upper through-hole, and a second left upper through-hole, the first fiber optic cable extending along an exterior surface of the rear exterior panel between the left intermediate through-hole and the first left upper through-hole, and further being trapped between the rear exterior panel and the rear interior panel between the first left upper through-hole and the second left upper through-hole.

Preferably, the front panel further includes a main front panel and a sub-main front panel, and a fastener detachably joining the main front panel to the sub-main front panel.

Most preferably, the first shoulder strap portion is formed by two adjacent sections of the first fiber optic cable and the second shoulder strap portion is formed by two adjacent sections of the second fiber optic cable.

In some versions, the fiber optic cables include an initial end joined to the light source and an opposite terminal end, such that the opposite terminal end is located on the shoulder strap portion.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
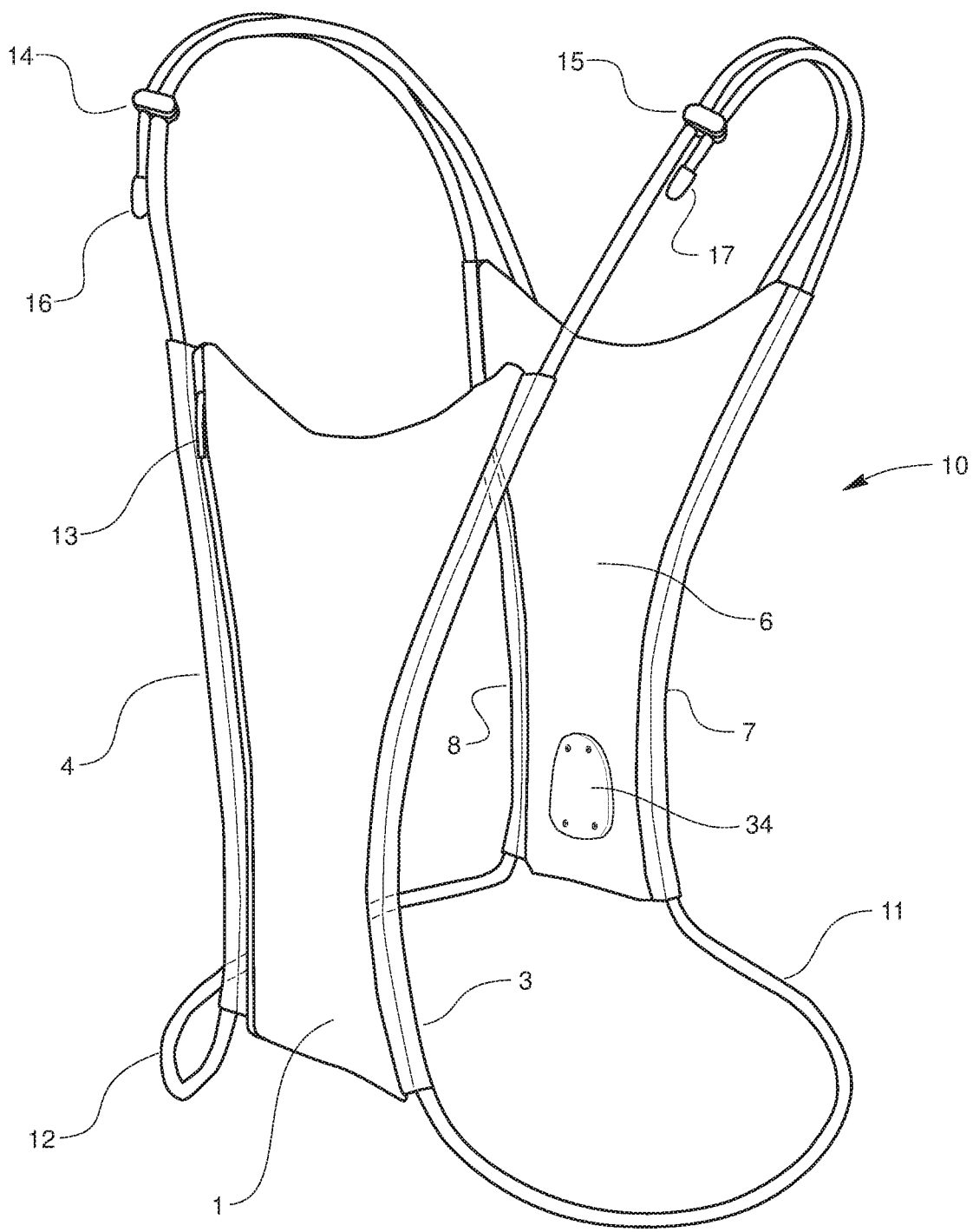
FIG. 1 is a front three-quarter perspective view of a preferred illuminated harness.

FIG. 1 is a front three-quarter perspective view of a preferred illuminated harness 10. The illuminated harness 10 as illustrated is composed of three main components: a front panel assembly, a rear panel assembly and a pair of optical fiber cables 11, 12, which are preferably side-illuminating.

In one version, the front panel assembly is comprised of a front exterior panel 1 attached to and positioned between a pair of front peripheral sleeves 3, 4 located at each side of the front panel. In other versions, the front panel assembly further includes a front interior panel 2 (see FIG. 2) in addition to the front exterior panel 1. The rear panel assembly is similarly comprised of a rear exterior panel 5 and a pair of rear peripheral sleeves 7, 8 located at each side of the rear exterior panel. As with the front panel, the rear panel assembly preferably includes a rear exterior panel 5 and a rear interior panel 6. The pair of optical fiber cables 11, 12 joins the front and rear panels to one another, and serves as both a belt and shoulder straps for a user when the illuminated harness is in use.

Figure 2:
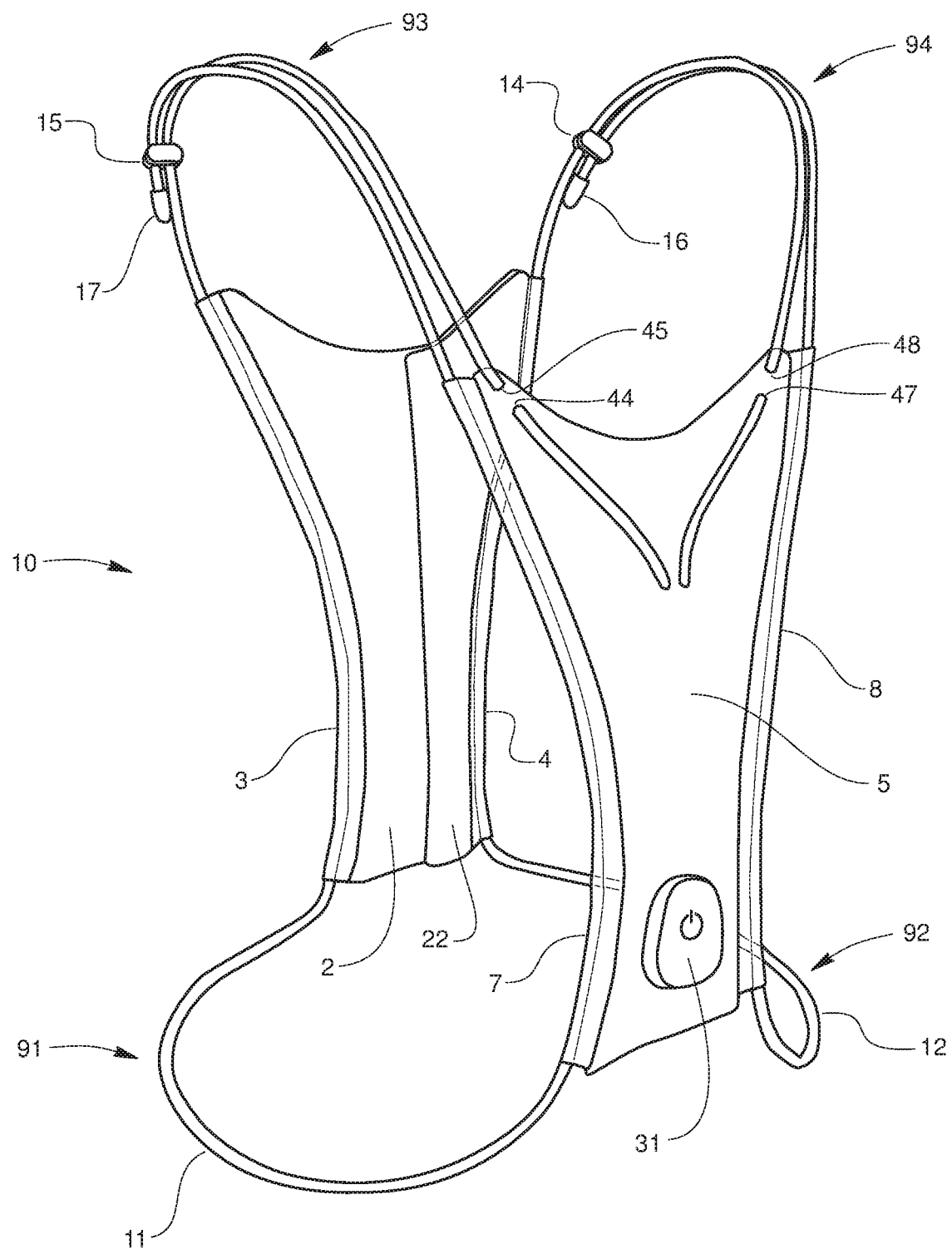
FIG. 2 is a rear three-quarter perspective view of a preferred illuminated harness.

With further reference to FIG. 2, the belt is defined by a first belt section 91 joining the base of the left side of the front panel assembly to the base of the left side of the rear panel assembly, and by a second belt section 92 joining the base of the right side of the front panel assembly to the base of the right side of the rear panel assembly. As illustrated, in the preferred version each of the first and second belt sections are portions of the fiber optic cables 11, 12 threaded through the panels. The shoulder straps include a left shoulder strap 93 defined by one or more sections of the optic cable (preferably the first cable 11) joining the left-top of the front panel assembly to the left-top of the rear panela assembly, and a right shoulder strap 94 defined by one or more sections of the optic cable (preferably the second cable 12) joining the right-top of the front panel assembly to the right-top of the rear panel assembly.

In a further preferred version, the front panel assembly is formed with selectively separable halves or portions, including a main front panel assembly and a sub-front panel assembly. In the illustrated example, the sub-front panel assembly includes an exterior face and an interior face. As with the main front panel assembly, the interior and exterior faces of the sub-front panel assembly may be formed from multiple sheets or layers of sheet material, including a sheet or layer forming the exterior sub-panel 21 and a sheet or layer forming the interior sub-panel 22.

Most preferably, the main front panel assembly is removably attachable to the sub-front panel assembly via a fastener such as a zipper. In the illustrated example, mating zipper halves are provided, including a first zipper half 23 on the main front panel assembly and a second zipper half 24 on the sub-front panel assembly. By operation of the zipper, the main front panel assembly may be fully separated from the sub-front panel assembly to allow the illuminated harness 10 to be worn by a user, with the zipper halves mated to secure the illuminated harness about the user's torso in the fashion of a vest or jacket.

Figure 11:
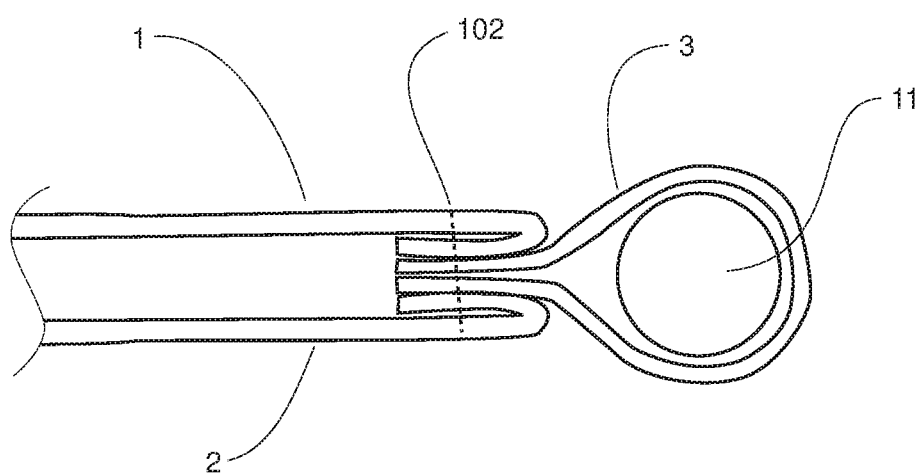
FIG. 11 is section view taken through A-A of FIG. 4.

The one or more panels forming the main front panel assembly are preferably die cut or otherwise formed from nylon fabric, ripstop or other fabric or sheet material. In the illustrated example, the exterior panel 1 and interior panel 2 are preferably sewn or otherwise joined at their periphery along a first stitch line 102 shown in FIG. 6, which also serves to trap a clear sleeve 3 in place along the edges of the front panel assembly, as best seen in the sectional views of FIGS. 11, 14, and 15.

In a preferred version, a first clear sleeve 3 forms a long tunnel substantially from the bottom of the main front panel assembly to the top of the main front panel assembly, along one of the sides. A second clear sleeve 4 likewise forms a tunnel from the bottom to the top of the sub-front panel assembly in the same fashion. An optical fiber 11 can be threaded through this tunnel or is otherwise placed within the sleeve 3 such that the optical fiber 11 is trapped in place and held captive within the sleeve. Most preferably, the optical fiber 11 is able to slide freely (but with some friction) within the sleeve such that it is held within the sleeve but provides for some movement to accommodate sizing and movement of the user.

In yet other versions, the sleeve may be discontinuous, such as in the form of a series of loops spaced apart along the length of either of the sides of the applicable panel.

Figure 7:
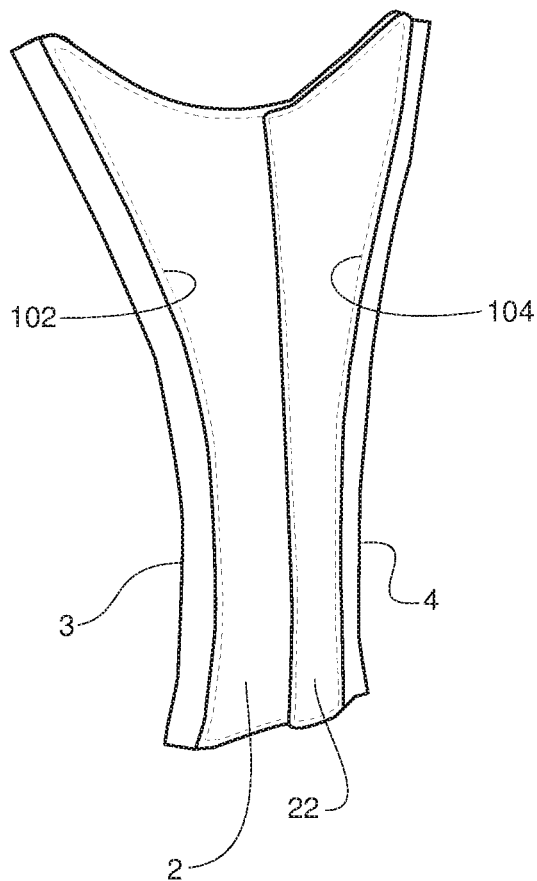
FIG. 7 is a rear three-quarter perspective view of the front panel assembly of FIG. 6.

The sub-front panel assembly is preferably formed in the same manner as with the main front panel assembly as described above, and in which the interior and exterior sub-panels 21, 22 are sewn or otherwise joined at their periphery along a second stitch line 104 shown in FIG. 7. As with the main front panel assembly, the joining of the sub-panels for the sub-front panel assembly preferably traps a second clear sleeve 4 in place between the interior and exterior sub-panels 21 and 22 (as best seen in the sectional views of FIGS. 14, 15) such that the clear sleeve 4 forms a long tunnel substantially from the bottom of sub-front panel assembly to the top of sub-front panel assembly along a peripheral edge. An optical fiber 12 can be threaded through this tunnel formed by the second sleeve 4 such that the optical fiber 12 is trapped in place and held captive but able able to slide freely (but with some friction) through this sleeve.

Figure 3:
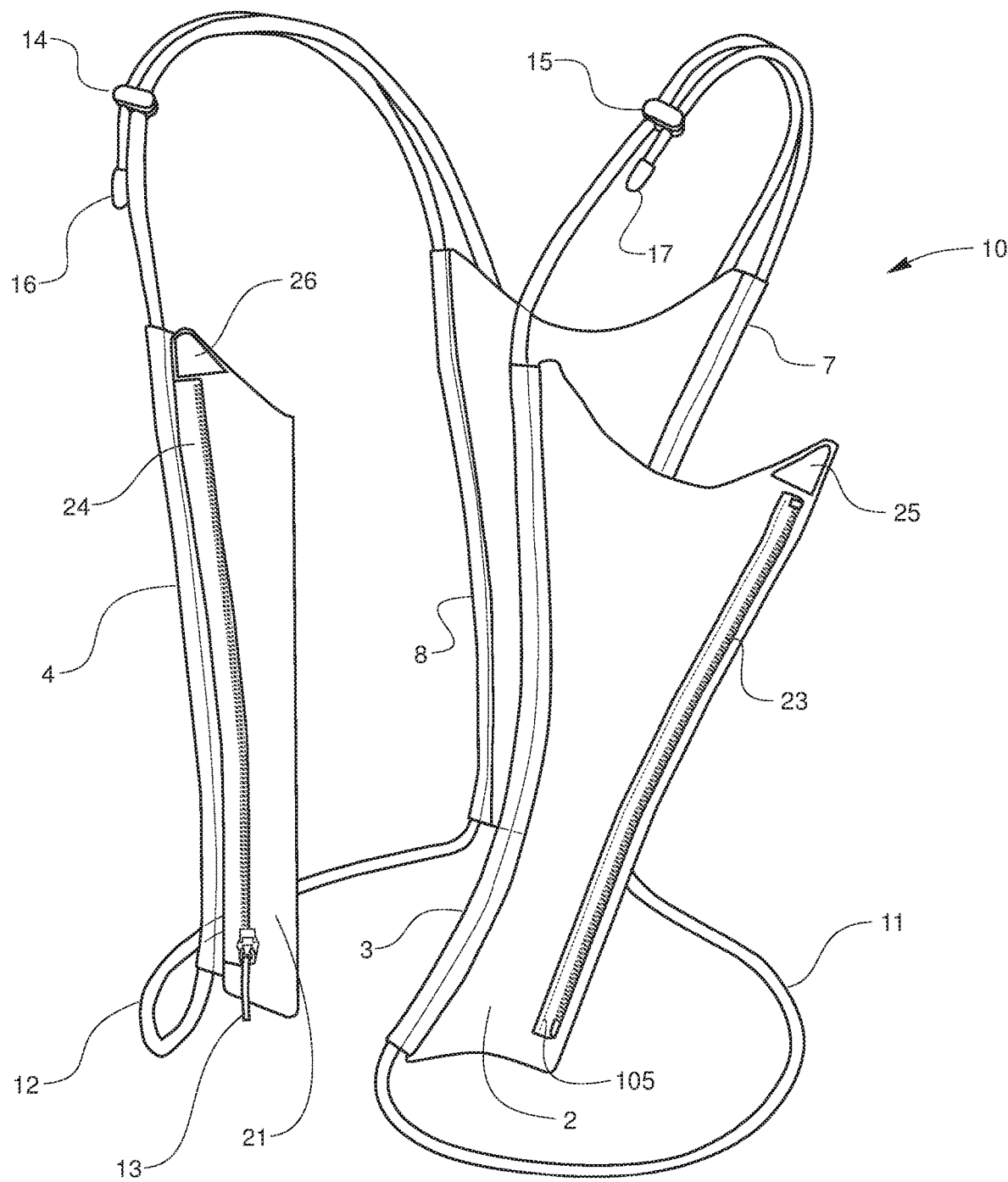
FIG. 3 is a is a front three-quarter perspective view of a preferred illuminated harness, showing zipper halves in an unzipped position.
Figure 14:
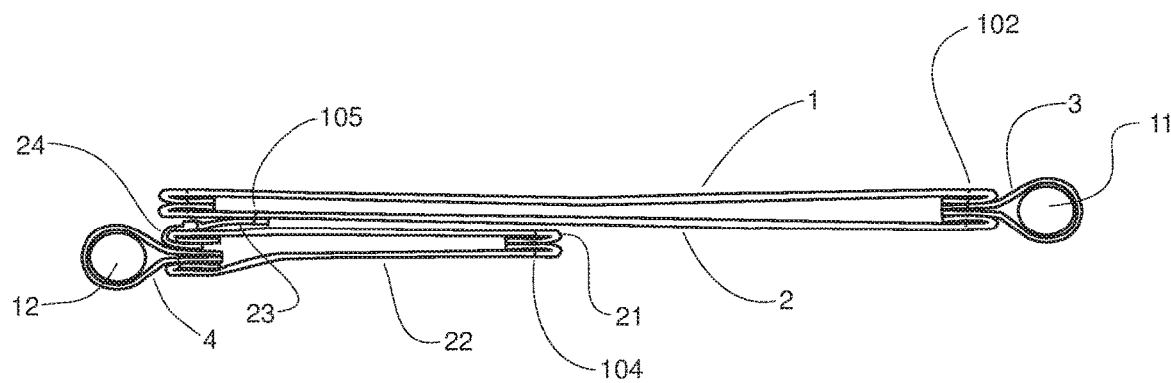
FIG. 14 is section view taken through B-B of FIG. 4 (zipper halves 23 and 24 are shown zipped.)
Figure 15:
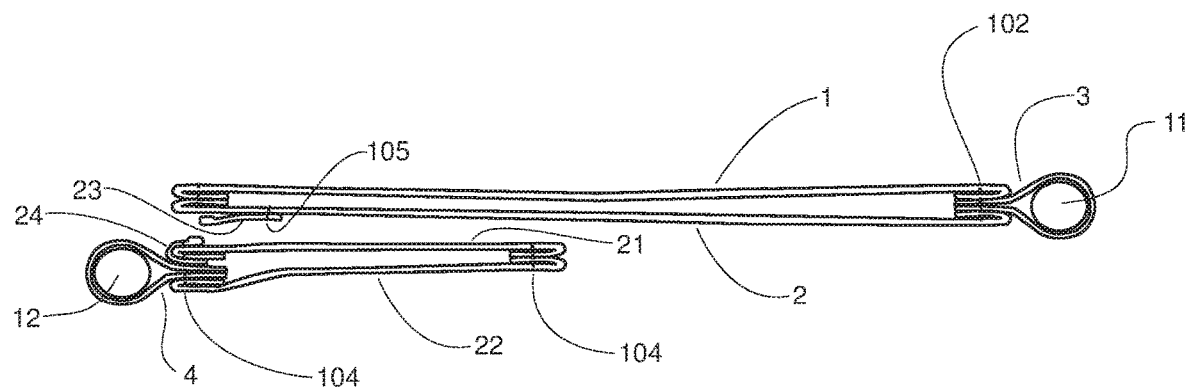
FIG. 15 is section view taken through B-B of FIG. 4 although zipper halves 23 and 24 are shown un-zipped.

As can be seen in FIGS. 3, 14 and 15 the first zipper half 23 is preferably sewn to the front interior panel 2 (or to the front panel generally) along a first zipper stitch 105 such that first zipper half 23 is held affixed to the front interior panel 2 substantially from the bottom to the top of main front panel assembly. The second zipper half 24 is preferably sewn to the sub-panel 21 held in place by second zipper stitch 104 such that the second zipper half 24 is held affixed to the sub-front panel substantially from the bottom to the top.

In one version, as best seen in FIG. 3, a top closure may also be incorporated. In the preferred version, the top closure is in the form of a hook fastener 26 and mating loop fastener 25. As illustrated, the loop fastener 25 is sewn to the front interior panel 2 substantially at the top end of main front panel assembly, and the hook fastener 26 is sewn to the sub-panel 21 substantially at the top end of sub-front panel assembly. When joined, the fasteners 25 and 26 mate to removably hold the top ends of main front panel assembly and sub-front panel assembly together substantially at their top ends. At the same time, a user may attach the zipper halves 23, 24 together and use the zipper pull 13 to interlock the zipper halves and thereby join the main front panel assembly and sub-front panel assembly together such that a user can wear illuminated harness 10 on the torso of the user.

Figure 8:
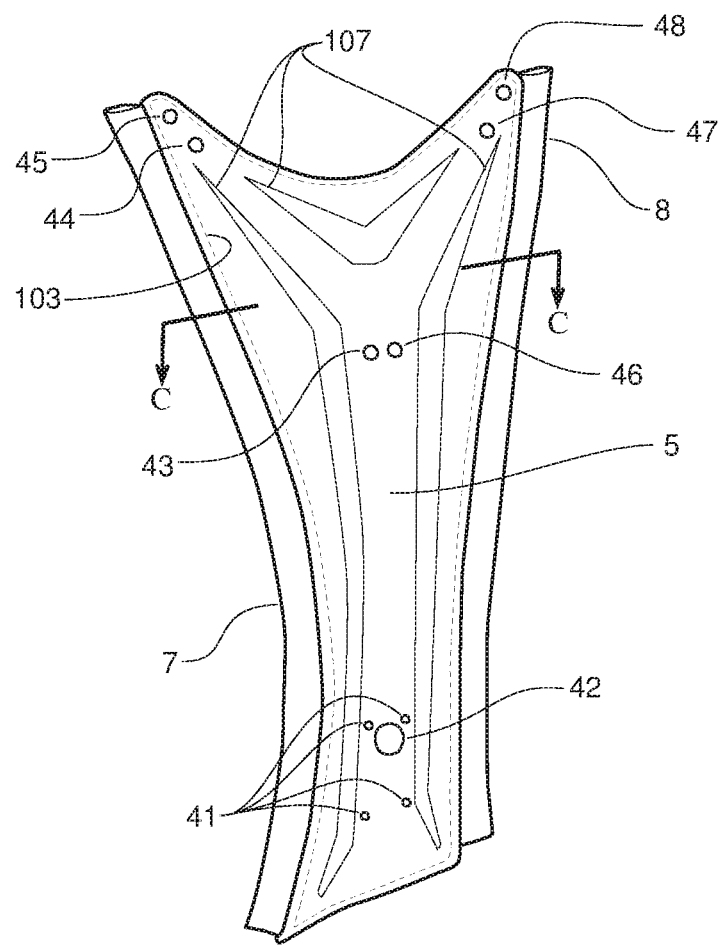
FIG. 8 is a rear three-quarter perspective view of the rear panel assembly of FIG. 6.
Figure 9:
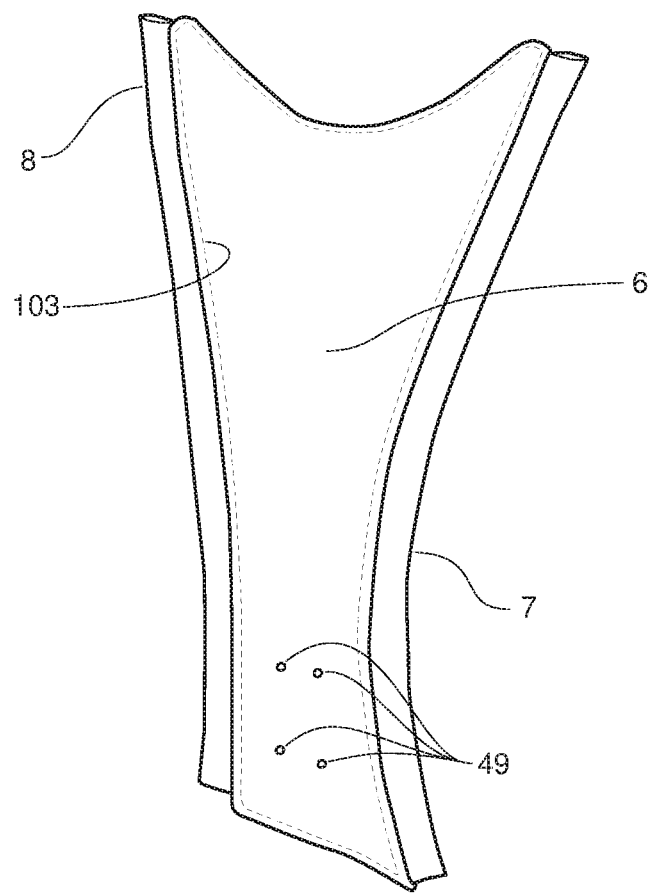
FIG. 9 is a front three-quarter perspective view of the rear panel assembly of the FIG. 6.
Figure 13:
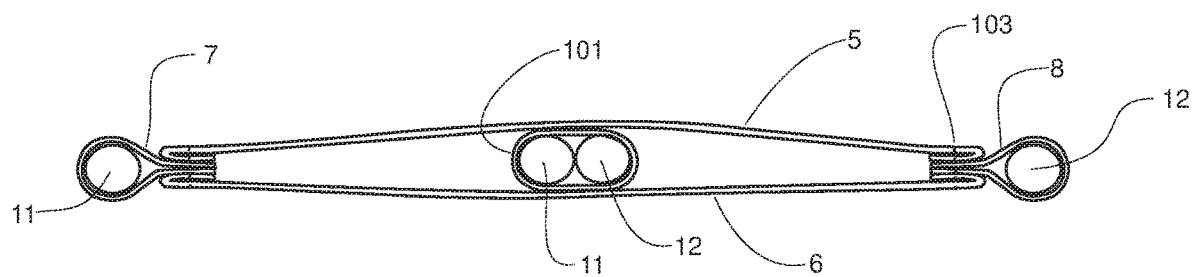
FIG. 13 is section view taken through D-D of FIG. 10.
Figure 12:
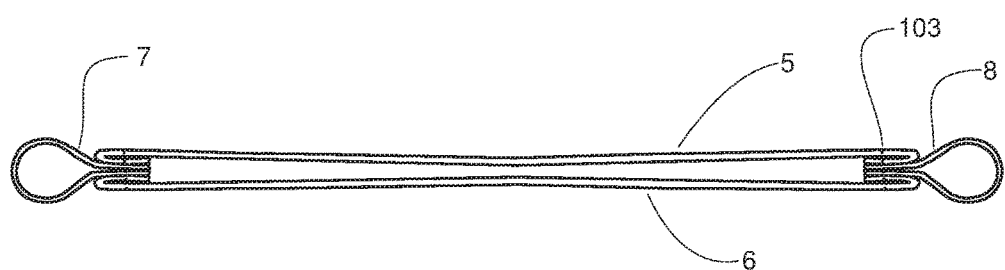
FIG. 12 is section view taken through C-C of FIG. 8.

FIG. 2 is a rear three-quarter perspective view of preferred embodiment 10 of the illuminated harness. The rear panel assembly is preferably composed of a rear exterior panel 5 (shown in FIG. 2) and a rear interior panel 6 (best viewed in FIG. 1). As with the front panel, the rear interior and exterior panels are preferably die cut or otherwise formed from nylon fabric, ripstop or other fabric or sheet material, then sewn together or otherwise attached at their periphery along a third stitch line 103 as shown in FIGS. 8, 9 and others. A pair of clear sleeves 7 and 8 are trapped in place (see FIGS. 12, 13 and others) by the stitching 103, such that the clear sleeves 7 and 8 form long tunnels substantially from the bottom of the rear panel assembly to the top of the rear panel assembly, one on each side. The first optical fiber 11 can be threaded through the tunnel formed by third clear sleeve 7 such that the optical fiber 11 is preferably trapped in place held captive but able to slide freely (but with some desirable friction) through this sleeve. Similarly, the second optical fiber 12 can be threaded through the tunnel formed by fourth sleeve 8 such that the optical fiber 12 is trapped in place held captive but preferably able to slide freely (but with some preferable friction) through the sleeve 8.

While the preferred version of the invention incorporates a pair of fiber optic cables, it should be appreciated that a single cable may be used rather than two. In one such version, the single cable may be continuously threaded along a path at one side of the harness as described above, and then across either the front or rear panel (at the top or the bottom, for example) and then threaded along a path at the other side of the harness as described above. Alternatively, one side may be illuminated and the other side may have a non-illuminated strap of fabric or other materials. In yet other versions, more than two cables may be used; for example, each side of the harness may employ an optic cable for the waist strap and an optic cable for the shoulder strap.

Figure 5:
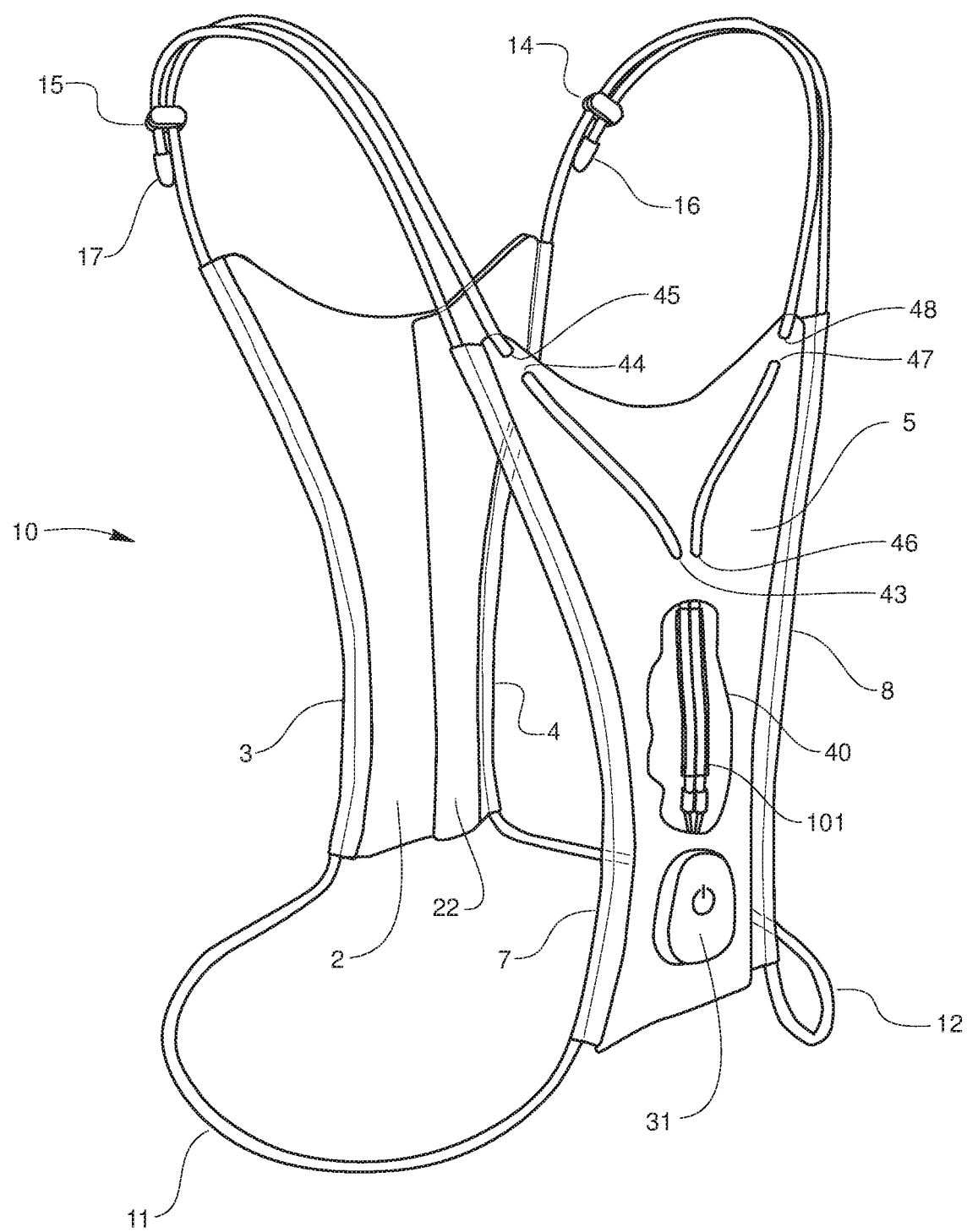
FIG. 5 is a rear three-quarter perspective view of a preferred illuminated harness, in partial cutaway view to illustrate a light source such as a light emitting diode.
Figure 18:
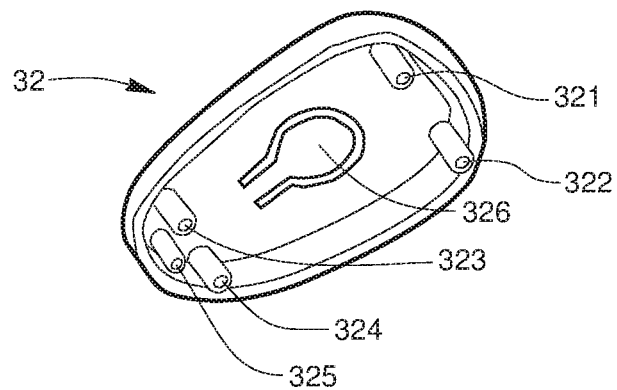
FIG. 18 is a perspective view of an inside of an enclosure cover, shown disassembled from a rear portion of the enclosure
Figure 17:
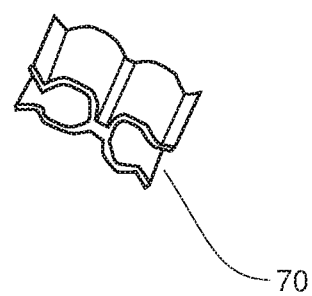
FIG. 17 is perspective view of a preferred optic fiber cable clip.

FIG. 5 is a rear three-quarter perspective view of an embodiment 10 of the invention, including a cut-away 40 shown in a portion of the rear exterior panel 5 to illustrate a preferred method of coupling the optic fibers to a preferred LED light source. A housing encloses a circuit and battery and is illustrated with a button membrane sticker 31 indicating an on/off switch. An exploded view of the housing and its preferred internal parts can be seen in FIG. 16. The housing is formed by enclosure halves 33 and 32 which house a circuit board 50, battery 53, and other related components, with the halves being joined together to form the housing by one or more screws such as screw 100 which extends through hole 335 into boss 325 (see FIG. 18). One or more lead wires, preferably including a plurality of lead wires 65, 66, 85, 86 (see FIG. 16, 19) extend from the circuit board 50 and are threaded through a hole 336 in a first enclosure half 33 wherein wires are threaded through hole 42 formed in the exterior rear panel 5 (shown in partial cutaway view in FIG. 16). The wires 65, 66, 85, 86 connect to a pair of LED elements 64 and 84, which are coupled to optic fibers 12 and 11 by means of friction sheaths 63 and 83 which are preferably plastic sheath couplers that join and hold the optic fibers 12 and 11 to the LEDs 64 and 84. The optic fibers 12 and 11 are further held in place by lengths of heat shrink tubing 62 and 82 such that the LED elements 64 and 84 are held and positioned to shine directly into the optic fibers 12 and 11.

While the housing is described and illustrated as being secured to the rear panel, in some versions it may instead be secured to the front panel, including either of the main front panel or the sub-front panel. Most preferably, the housing is otherwise configured as described above, except for its location at the front rather than the rear.

After the optic fibers and related wires are threaded through hole 42, the assembled battery and circuit enclosure is mounted to the rear panels 5 and 6 by screws 101 through holes 61 in backing plate 34, through holes 49 in panel 6, through a set of lower holes 41 in panel 5, through holes 331, 332, 333, and 334 securing into bosses 321, 322, 323 and 324, thereby securing the electronics/battery enclosure in place on panels 5 and 6 and trapping wires 65, 66, 85, 86 in place between panel 34 and part 33.

The LEDs 64 and 84 are driven by the circuit 50 and battery 53, and actuated by the user by a switch 51. Most preferably, the flexible membrane sticker covers the switch with a graphic indicator located over the switch when attached, wherein a user may press on the flexible membrane sticker 31 attached to the enclosure front 32. Pressing on the membrane 31 applies a force to a flexible cantilever 326, and in turn to a switch 51 to actuate the switch, thereby allowing a user to activate the LEDs, and to change flash modes or effects that are programmed into electronics/chips on the circuit board 50.

As can be seen in the illustrated cut-away section in the exterior rear panel 5 in FIG. 5, the optic fibers 11 and 12 are held together by a length of clear heat shrink tubing 101 that allows light pass through to illuminate the exterior rear panel 5 but also acts as a strain relief such that force imparted by a user on the optic fibers 11 and 12 is not transferred to the coupling area of the LEDs. In addition, the tubing 101, which is firmly affixed to the optic fibers 11 and 12 and secures them together, creates an enlarged area which is wider than the diameter of the holes 43 and 46, which thereby prevents the tubing 101 from travelling through the holes 43 and 46 while at the same time gripping the optical fibers 11 and 12 to act against a pulling force from a user.

Figure 10:
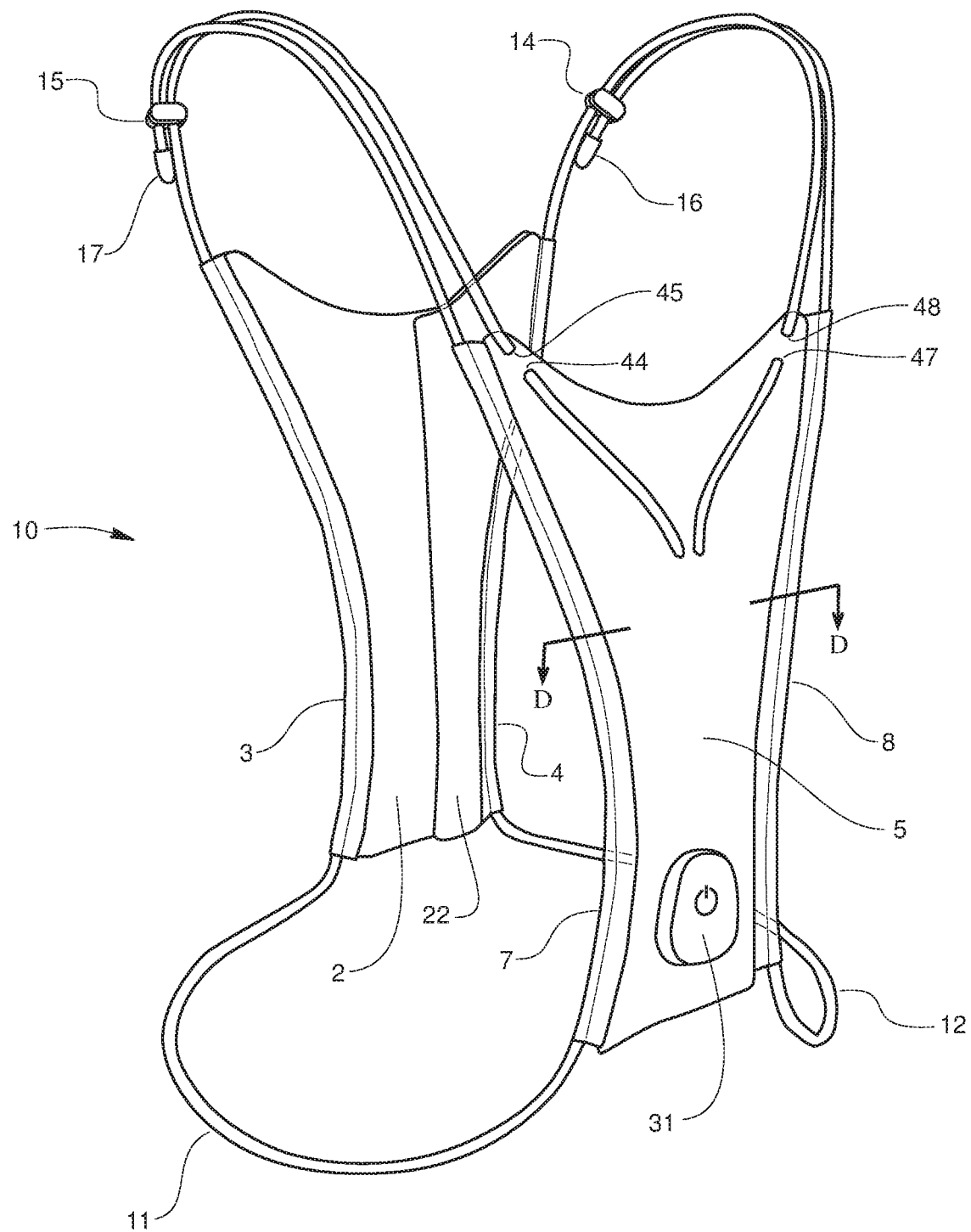
FIG. 10 is a rear three-quarter perspective view of a preferred illuminated harness.

As can be seen in FIG. 5 and FIG. 8 after traveling between panels 5 and 6, the first optic fiber 11 is threaded out of a left intermediate through-hole 43 in panel 5 back down through a left first upper through-hole 44 in panel 5 and back out through a left second upper through-hole 45 in panel 5 (with the second upper through hole 45 being positioned closer to the top end of the panel). The second optic fiber 12 is similarly threaded out through a right intermediate through-hole 46 in panel 5 back down through a right first upper through-hole 47 in panel 5 and back out through a right second upper through-hole 48 in panel 5. The first optic fiber 11, after emerging from the left first upper hole 45 in panel 5, serves as the left shoulder strap of the vest 10 and then travels into one side of a first double-hole cord lock 15 (see FIG. 10) and then the first optical fiber 11 travels into the top of the sleeve 3 and down to the bottom of the sleeve 3 such that when it emerges from the bottom of the sleeve 3 at the base of main front panel assembly, the first optic fiber 11 forms the left waist strap of the vest 10. A length of the optical fiber 11 then travels up into sleeve 7 starting at the base of the rear panel assembly, then emerges out of the top of the sleeve 7 adjacent the hole 45 doubling with itself and further serving as the left shoulder strap which is thereby formed as two sections of the optical fiber 11. The end of the optical fiber 11 travels into the other side of the double-hole cord lock 15 and terminates with a first cord-end 17, which is preferably clear or translucent.

In a similar manner, the second optic fiber 12 after emerging from the right second upper hole 48 in panel 5 forms the right shoulder strap of the vest 10 and then travels into one side of a second double-hole cord lock 14 and then fiber 12 travels into the top of sleeve 4 and emerges from sleeve 4 at the base of sub-front panel assembly. The second optic fiber 12 then forms the right waist strap of the vest 10, then travels up into sleeve 8 at the base of rear panel assembly, and emerges out the top of sleeve 8 adjacent hole 48 doubling with itself and further serving as the right shoulder strap, finally being inserted into the other side of the second double-hole cord lock 14 and terminates with a second cord-end 16 which is also preferably clear.

The cord ends 16 and 17 are preferably permanently affixed to the distal ends of the optic fibers 12 and 11 so that they act to collect and disperse light traveling through the fibers 12 and 11. The cord ends thereby aid in retaining the optic fibers within the cord locks 14 and 15 while further serving as light dispersing elements. In one version, the cord ends 16 and 17 are preferably textured or frosted plastic, rubber, silicone, or other material that fit on the ends of fibers 11 and 12 and are glued, heat bonded or otherwise affixed in place. Cord ends 16 and 17 could also be integrally formed with fibers 12 and 11 such that they still provide the desired retention and light dispersing functions.

The fiber elements 11 and 12 are preferably each made of a length of unwoven (or in some cases woven as desired) side-emitting optic fiber/cord. In various versions, the optic fiber may comprise any suitable optic fiber, and may be coated with Polytetrafluoroethylene (PTFE) coating or other synthetic fluorine-containing polymer coating. In an exemplary version, the fiber may be made of ClearCurve® optical fiber by Corning Inc., and may have surface abrasions to control or accentuate the light emitted by the optic fiber. It is preferably flexible, durable and of a diameter that is comfortably worn against the body as well as not too thick as to be cumbersome. The thickness of the optical fiber may be of any suitable size, with a 2 mm to 5 mm diameter being preferable and a 3 mm diameter in many cases being an optimal diameter for the optic fiber elements 11 and 12. Material used for optic fiber elements 11 and 12 is best chosen such that the material allows consistent side-transmission of light such that a consistent glow can be achieved for the full length of the fibers 11 and 12. The fiber optic elements 11 and 12 are preferably manufactured from clear flexible plastic and are manufactured using a process such as extrusion to achieve the desired result. It may be desirable to introduce light-effusing material, features or other components into the plastic such as bubbles, micro-spheres, or other light-effusing articles so that light traveling down fibers 11 and 12 is effectively and consistently effused out the side of the fiber in a consistent and reliable manner such that the full length of optic fibers 11 and 12 have consistent and bright light emitted out the side of the fiber and so that there is also minimal light lost along the length of the optic fiber.

Figure 4:
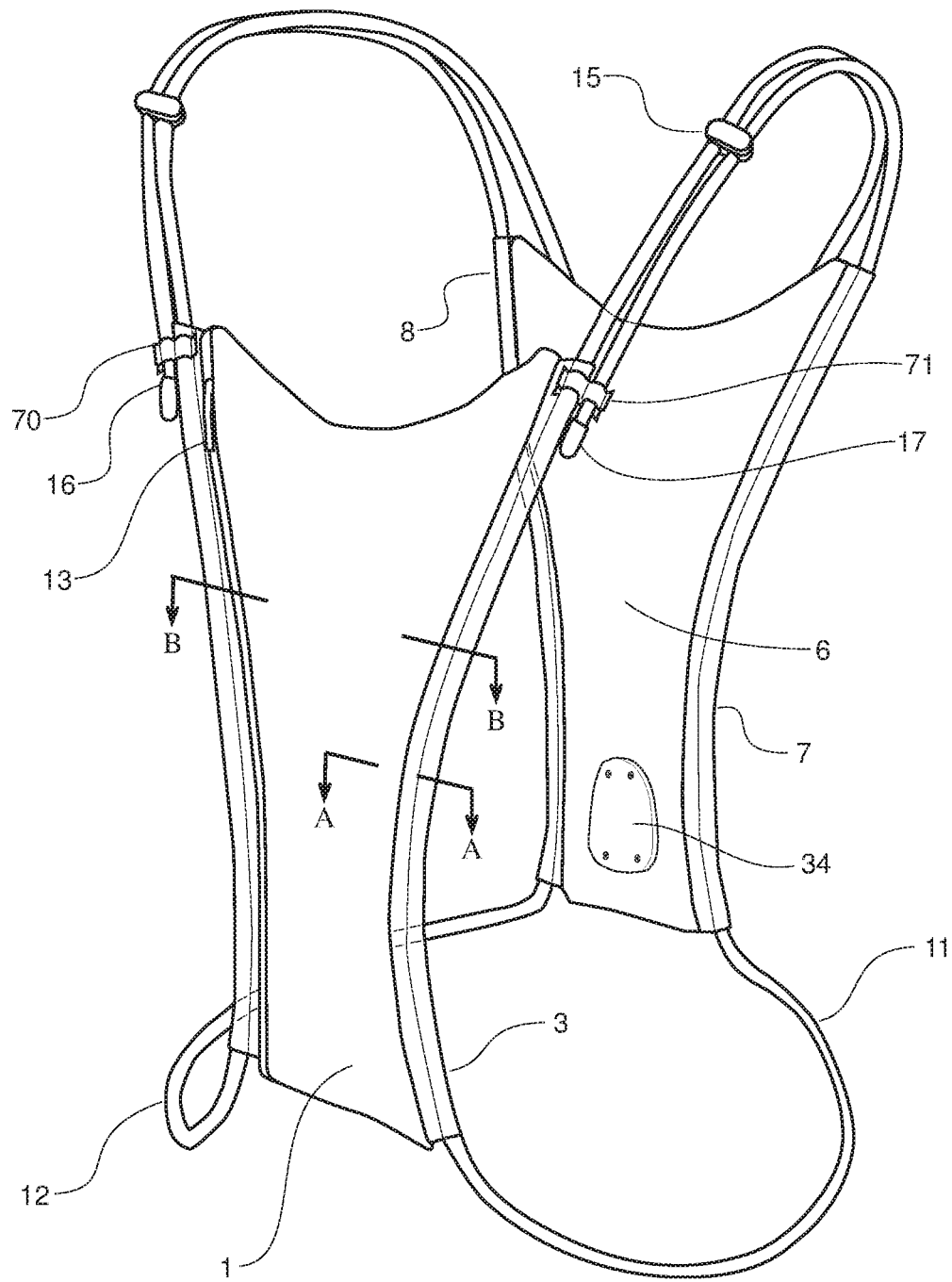
FIG. 4 is a front three-quarter perspective view of a preferred illuminated harness illuminated, shown with an adjusting cord and clip and a fiber optic cable.

The cord locks 14 and 15 are coupled to the optic fiber structure as described above and as shown in FIG. 10. The cord locks prevent the optical fiber structure from moving lengthwise and are preferably press-actuated to allow a user to adjust the size of the vest 10 For example, as seen in FIG. 4, the optic fiber elements 11 and 12 have been adjusted as compared to their position in FIG. 10 by sliding the optical cables 11 and 12 through the sleeves 3, 4, 7, 8 and affixing them in place with the cord locks 14 and 15 and a pair of optional cord clips 70 and 71. In this manner, the vest 10 has been made to fit a smaller torso and it can be understood that by adjusting the cables 11 and 12 through the sleeves 3, 4, 7, 8 and fixing them in place via cord locks 14 and 15 and controlling the excess optic fiber with optional clips 70 and 71, a large variety of torso sizes can be accommodated by increasing or decreasing the shoulder strap length and likewise increasing or decreasing the belt or waist size. The cord locks are preferably chosen such they hold the optical fiber in place but do not kink or damage them such that the light transmission is not adversely affected.

Figure 19:
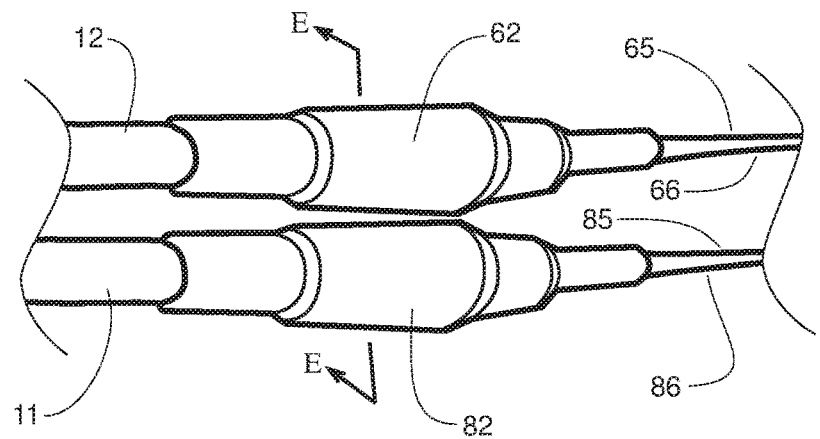
FIG. 19 is an illustration of a pair of optic cables and coupled LEDs, shown in partial cutaway view.
Figure 20:
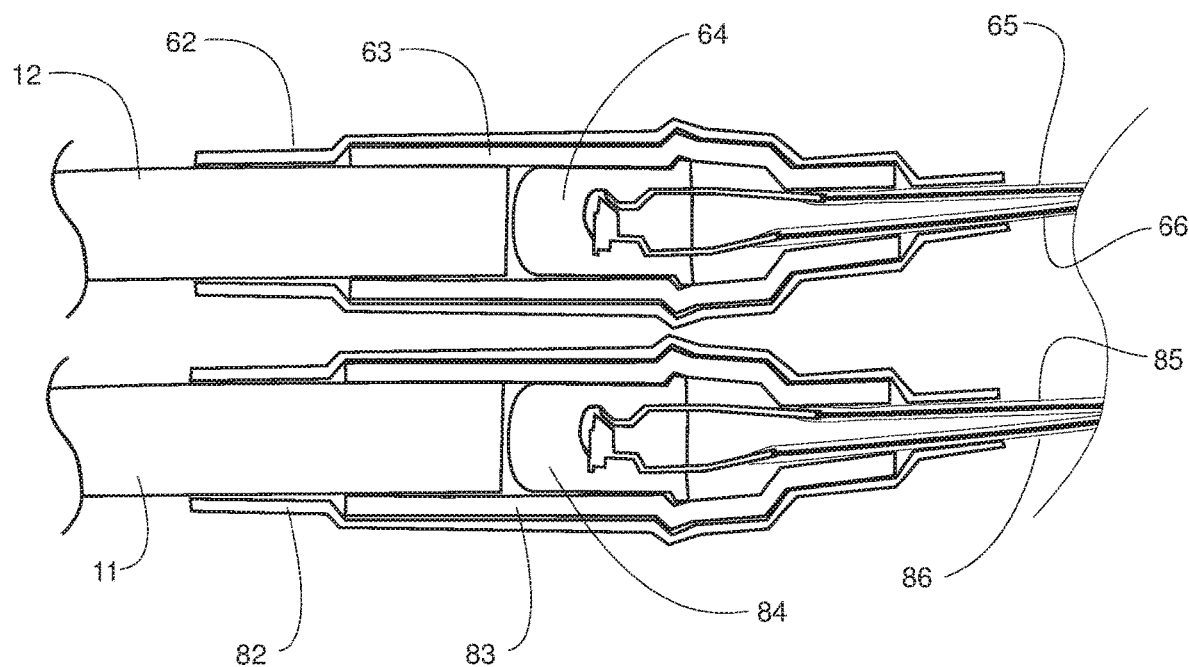
FIG. 20 is section view taken through E-E of FIG. 19
Figure 21:
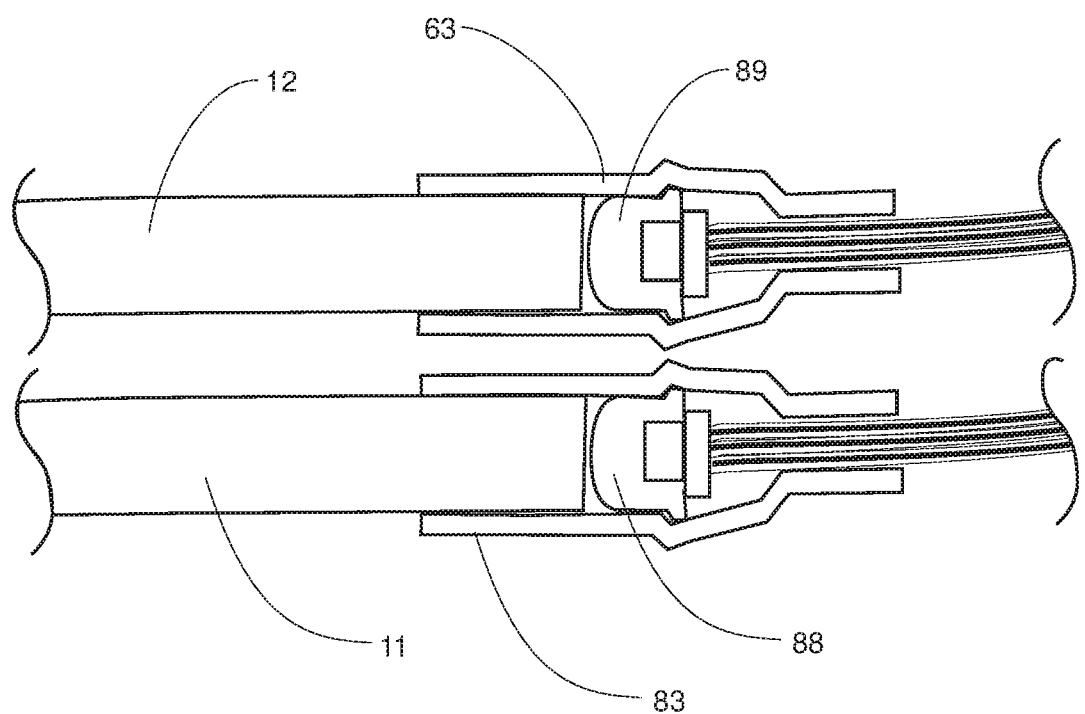
FIG. 21 is a section view taken through E-E of FIG. 19, but in which a multi-color LED is illustrated.

In some versions, a variety of LED lights or other light sources can be applied to the ends of the cables 11 and 12. FIG. 21, for example, shows a multicolor LED 88 coupled with the first fiber optic cable 11, joined together with coupling sleeve 83. A shrink tubing such as illustrated in FIG. 19 may also be included, but is omitted in FIG. 21 for simplicity and to illustrate the optional nature of the shrink tubing. The other LED 89 may likewise be a multicolor LED, or may differ from the first LED 88. In various versions, any of a number of different LED options can be applied to illuminated harness 10 and driven by appropriate electronics housed in mentioned enclosure shown in FIG. 16 wherein a variety of effects, colors and lighting styles can be achieved driven by the mentioned electronics, LEDs, electronics programming, etc. In some examples, a user can choose a desired lighting effect by pressing the actuator button 51 and further control the effect as well as turn on and off the lighting elements through interaction with button 51. In some cases it may be desirable to incorporate other buttons into the electronics/battery enclosure but in many cases only one button is needed for control of the lighting features of illuminated vest 10.

Figure 6:
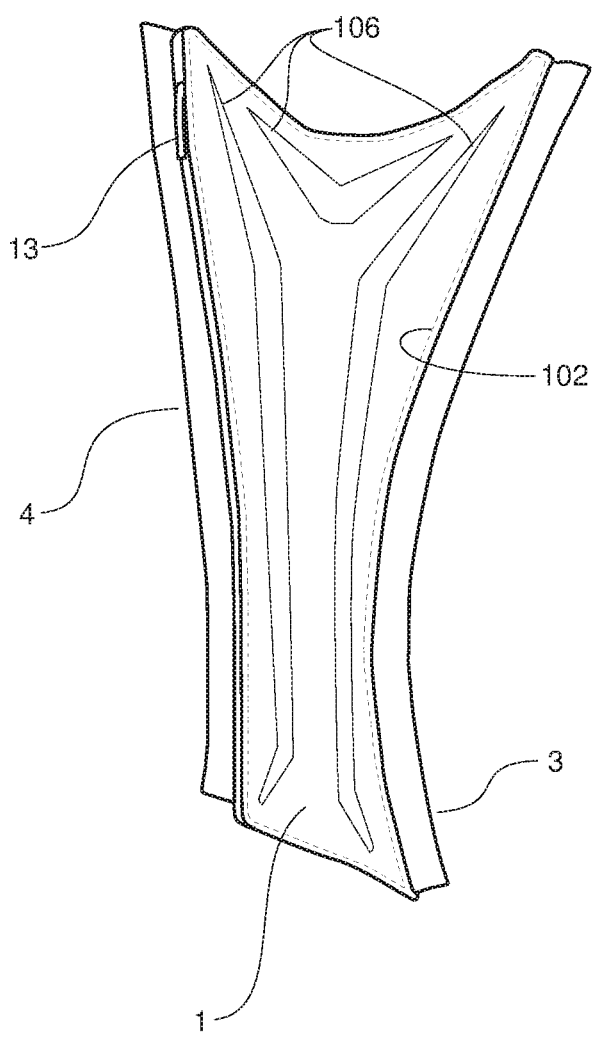
FIG. 6 is a front three-quarter perspective view of a preferred front panel assembly, in which the optic fiber has been removed and rear panel is not shown.

The illuminated harness 10 preferably has active lighting as well as retro-reflective areas which reflect the lights of a car or other light source such that a driver of a car can not only see the light source produced by the illuminated harness but also see the retro-reflected light from the car headlights. Preferable retro-reflective areas 106 and 107 are shown in FIG. 6 and FIG. 8, illustrated as retro-reflective material adhered or otherwise applied or secured to the surface of the corresponding panels.

As can be seen in FIG. 5, the optic fibers 11 and 12 travel up between panels 5 and 6 and confined in this interior area by a clear heat shrink tube 101. The rear panel 5 is preferably made of a translucent rip stop nylon or other translucent material such that light emitted from optic fibers and through the tubing tube 101 also lights up and travels through the back panel 5 such that back panel 5 acts as a light-effusing surface and appears to glow with light from the fibers 11 and 12.

As can be seen in FIG. 3, the preferred illuminated harness 10 may be fastened together by a user using zipper halves 23 and 24 with local hook/loop elements 25 and 26 preferably located to fix the top corners of the sub-front panel assembly and main front panel assembly. In some cases it may be desirable to use a hook and loop tape or mating magnets to affix a larger portion or the entirety of the main front panel assembly to the sub front panel assembly. The hook and loop fasteners 25 and 26, and/or the zipper, may be replaced with snaps, hooks or other fasteners or removed with varying functional results and with varying degrees of success.

Figure 16:
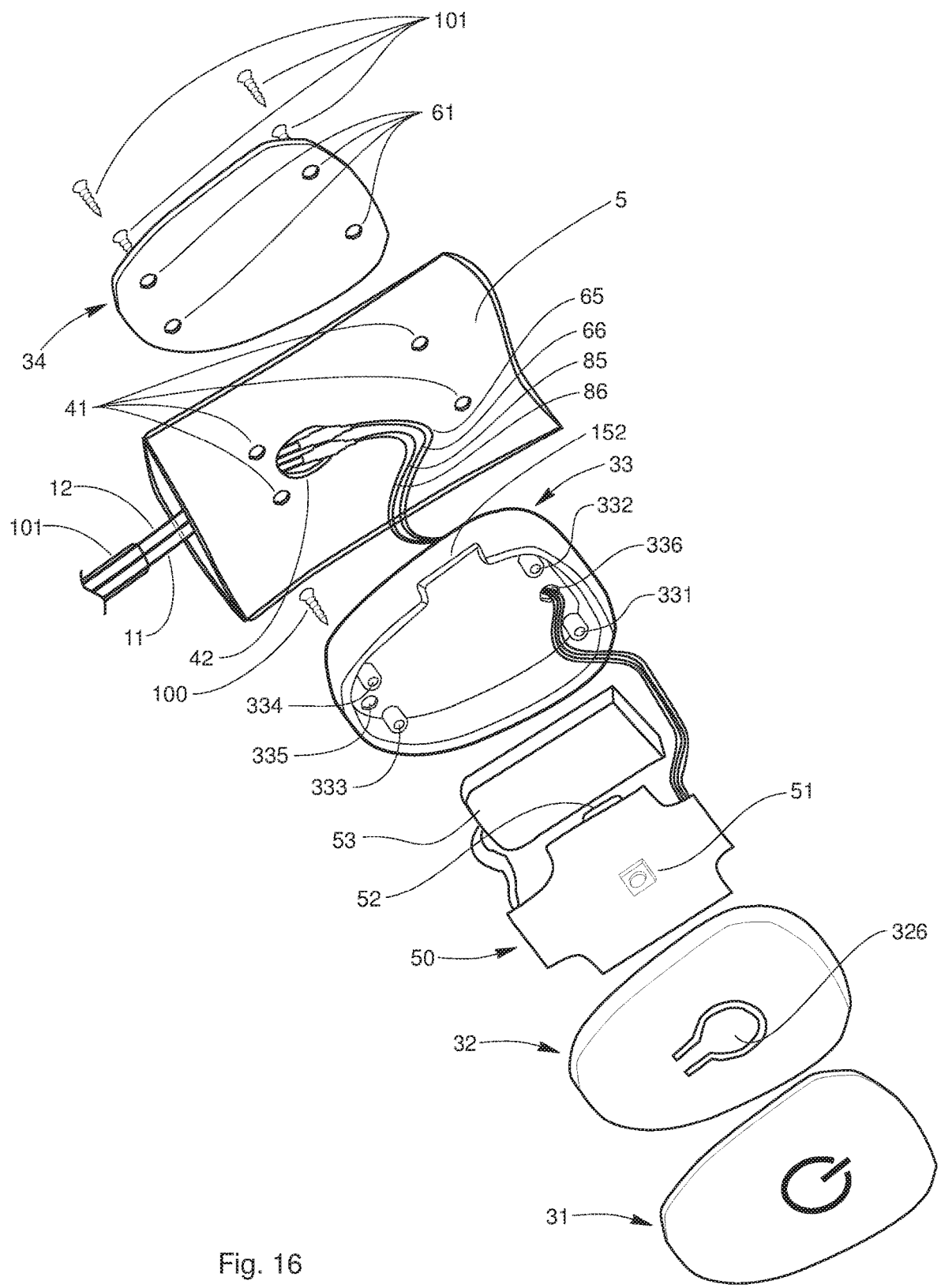
FIG. 16 is an exploded view of a preferred electronics assembly and enclosure.

An advantage of the illuminated harness 10 is that it preferably comprises a discrete electronics/battery enclosure such as illustrated in the exploded view shown in FIG. 16, allowing this enclosure to be sized to easily fit the required electronic components/battery with little manufacturing impact to the harness 10. In this manner, future generations of the harness 10 can employ an enclosure which is larger or smaller or take on whatever form is required with very minimal required changes to the configuration/design of the harness 10, thereby minimizing manufacturing time to market and other development and design costs, and providing efficient means for updates to battery size/shape and other potential future electronic improvements.

As mentioned above, the sleeves 3, 4, 7, 8 are preferably made from clear or translucent material such as TPU, PVC or other materials and are preferably manufactured by cutting from sheet material or strips of material and folded and sewn in place. The sleeves may alternatively be molded or otherwise formed to produce a similar result.

FIG. 16 shows an exploded view of the electronics/battery enclosure. The circuit board 50 connects to a battery 53 (preferably rechargeable) such that a user can recharge the battery through a USB or other connector 52 which is preferably accessible through a connector port opening 152. A water/dust seal cover may be included but is not shown. It should be noted that the electronics enclosure design is flexible to allow a variety of technologies to be incorporated. For example, inductive charging elements can be incorporated, the electronics could be wi-fi enabled such that a user could program the electronics and thus the effects of the light emitted. The electronic enclosure as designed as a discrete pod-like element which allows the flexibility of just changing out this pod-like electronics/battery enclosure such that the electronics can be easily updated as desired with minimal cost and manufacturing impact. In some versions, a connector may be integrated into the electronic/circuit board to allow the enclosure to more easily be removed from the vest and optic cables to be swapped out for a different one relatively easily.

Electronics/battery enclosure halves are preferably injection molded from plastic or other materials, as are the cord locks and cord clips.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

We claim:

1. An illuminated harness, comprising:
   a front panel assembly having a base, a top, a left side, and a right side;
   a rear panel assembly having a base, a top, a left side, and a right side;
   a side-illuminating fiber optic cable and a light source coupled to the fiber optic cable and being arranged to transmit light into the fiber optic cable;
   the fiber optic cable being attached to the front panel assembly, the fiber optic cable being slidably moveable with respect to the front panel assembly for adjustment of the front panel assembly along the fiber optic cable when the fiber optic cable is coupled to the light source, the fiber optic cable further being attached to the rear panel assembly and being slidably moveable with respect to the rear panel assembly for adjustment of the rear panel assembly along the fiber optic cable when the fiber optic cable is coupled to the light source, the fiber optic cable having:
      a first belt portion joining the left side of the base of the front panel assembly to the left side of the base of the rear panel assembly;
      a second belt portion joining the right side of the base of the front panel assembly to the right side of the base of the rear panel assembly, whereby the first belt portion and the second belt portion are configured to be positioned about a waist of a user when the illuminated harness is worn by the user;
      a first shoulder strap portion joining the left side of the top of the front panel assembly to the left side of the top of the rear panel assembly; and
      a second shoulder portion strap joining the right side of the top of the front panel assembly to the right side of the top of the rear panel assembly, whereby the first shoulder strap portion and the second shoulder strap portion are configured to be positioned over the shoulders of the user when the illuminated harness is worn by the user.

2. The illuminated harness of claim 1, wherein the fiber optic cable further comprises a first fiber optic cable and a second fiber optic cable, the first fiber optic cable continuously forming the first belt portion and the first shoulder strap portion, and the second fiber optic cable continuously forming the second belt portion and the second shoulder strap portion.

3. The illuminated harness of claim 2, further comprising:
   a first peripheral sleeve attached to the left side of the front panel assembly; and
   a second peripheral sleeve attached to the right side of the front panel assembly;
   the first fiber optic cable being threaded through the first peripheral sleeve for slidable movement of the first fiber optic cable within the first peripheral sleeve, and the second fiber optic cable being threaded through the second peripheral sleeve for slidable movement of the second fiber optic cable within the second peripheral sleeve.

4. The illuminated harness of claim 3, further comprising:
a third peripheral sleeve attached to the left side of the rear panel assembly; and
a fourth peripheral sleeve attached to the right side of the rear panel assembly;
the first fiber optic cable being threaded through the third peripheral sleeve for slidable movement of the first fiber optic cable within the third peripheral sleeve, and the second fiber optic cable being threaded through the fourth peripheral sleeve for slidable movement of the first fiber optic cable within the fourth peripheral sleeve.

5. The illuminated harness of claim 4, wherein the first peripheral sleeve extends continuously from the top of the front panel assembly to the bottom of the front panel assembly, and the second peripheral sleeve extends continuously from the top of the front panel assembly to the bottom of the front panel assembly.

6. The illuminated harness of claim 4, wherein each of the first peripheral sleeve and the second peripheral sleeve is formed from a translucent material.

7. The illuminated harness of claim 2, wherein the rear panel further comprises a rear interior panel and a rear exterior panel.

8. The illuminated harness of claim 7, further comprising a housing containing a battery and having a power switch, the housing being attached to the rear panel.

9. The illuminated harness of claim 8, wherein the light source is electrically coupled to the battery and wherein a portion of the first fiber optic cable and the second fiber optic cable is trapped between the rear interior panel and the rear exterior panel.

10. The illuminated harness of claim 9, wherein the rear exterior panel is formed from a translucent material.

11. The illuminated harness of claim 8, wherein the housing is positioned at the base of the rear panel, centrally located between the left side and the right side of the rear panel.

12. The illuminated harness of claim 9, wherein the rear exterior panel further comprises a left intermediate through-hole, a first left upper through-hole, and a second left upper through-hole, the first fiber optic cable extending along an exterior surface of the rear exterior panel between the left intermediate through-hole and the first left upper through-hole, and further being trapped between the rear exterior panel and the rear interior panel between the first left upper through-hole and the second left upper through-hole.

13. The illuminated harness of claim 2, wherein the front panel further comprises a main front panel and a sub-main front panel, and a fastener detachably joining the main front panel to the sub-main front panel.

14. The illuminated harness of claim 2, wherein the first shoulder strap portion is formed by two adjacent sections of the first fiber optic cable and the second shoulder strap portion is formed by two adjacent sections of the second fiber optic cable.

15. The illuminated harness of claim 14, wherein the first fiber optic cable includes an initial end joined to the light source and an opposite terminal end, and further wherein the opposite terminal end is located on the first shoulder strap portion.

16. The illuminated harness of claim 14, wherein the first fiber optic cable includes an initial end joined to the light source and an opposite terminal end, and further wherein the opposite terminal end is located on the front panel assembly.

17. An illuminated harness, comprising:
a front panel assembly having a base, a top, a left side, and a right side;
a rear panel assembly having a base, a top, a left side, and a right side;
a side-illuminating fiber optic cable and a light source coupled to the fiber optic cable and arranged to transmit light into the fiber optic cable;
the fiber optic cable being attached to the front panel assembly such that the light from the fiber optic cable is visible between the top of the front panel assembly and the base of the front panel assembly, the fiber optic cable further being attached to the rear panel assembly such that the light from the fiber optic cable is visible between the top of the rear panel assembly and the base of the rear panel assembly;
the fiber optic cable having:
a first belt portion joining the front panel assembly to the rear panel assembly;
a second belt portion joining the front panel assembly to the rear panel assembly, whereby the first belt portion and the second belt portion are configured to be positioned about a waist of a user when the illuminated harness is worn by the user;
a first shoulder strap portion joining the front panel assembly to the rear panel assembly; and
a second shoulder portion strap joining the front panel assembly to the rear panel assembly, whereby the first shoulder strap portion and the second shoulder strap portion are configured to be positioned over the shoulders of the user when the illuminated harness is worn by the user.

18. The illuminated harness of claim 17, wherein the fiber optic cable further comprises a first fiber optic cable and a second fiber optic cable, the first fiber optic cable continuously forming the first belt portion and the first shoulder strap portion, and the second fiber optic cable continuously forming the second belt portion and the second shoulder strap portion.

19. The illuminated harness of claim 18, wherein the first fiber optic cable extends continuously from the light source to the first shoulder strap portion to the first belt portion and again to the first shoulder strap portion, wherein the first shoulder strap portion is formed by two sections of the first fiber optic cable.

20. The illuminated harness of claim 18, wherein the second fiber optic cable extends continuously from the light source to the second shoulder strap portion to the second belt portion and again to the second shoulder strap portion, wherein the second shoulder strap portion is formed by two sections of the second fiber optic cable.

21. The illuminated harness of claim 18, wherein the first fiber optic cable extends continuously from the light source to the first shoulder strap portion, through a first translucent sleeve attached to the front panel assembly, and then to the first belt portion.

22. The illuminated harness of claim 18, wherein the second fiber optic cable extends continuously from the light source to the second shoulder strap portion, through a second translucent sleeve attached to the front panel assembly, and then to the second belt portion.

23. The illuminated harness of claim 17, wherein the light source is coupled to a power source mounted to a housing, the housing being positioned centrally on the rear panel assembly between the first belt portion and the second belt portion.

24. The illuminated harness of claim 23, wherein the rear panel assembly further comprises a rear interior panel and a rear exterior panel, the rear exterior panel being translucent, at least a portion of the first fiber optic cable and the second fiber optic cable being trapped between the rear interior panel and the rear exterior panel and positioned to transmit light through the rear exterior panel.

25. The illuminated harness of claim 17, wherein the front panel further comprises a main front panel and a sub-main front panel, and a fastener detachably joining the main front panel to the sub-main front panel.

\* \* \* \* \*